June 7, 1955
M. C. MARKS
2,709,984
ELECTRIC FISH SCREEN ELECTRODE INCORPORATING
A SELF-CONTAINED LIGHT SOURCE
Filed Sept. 8, 1950
2 Sheets-Sheet 1
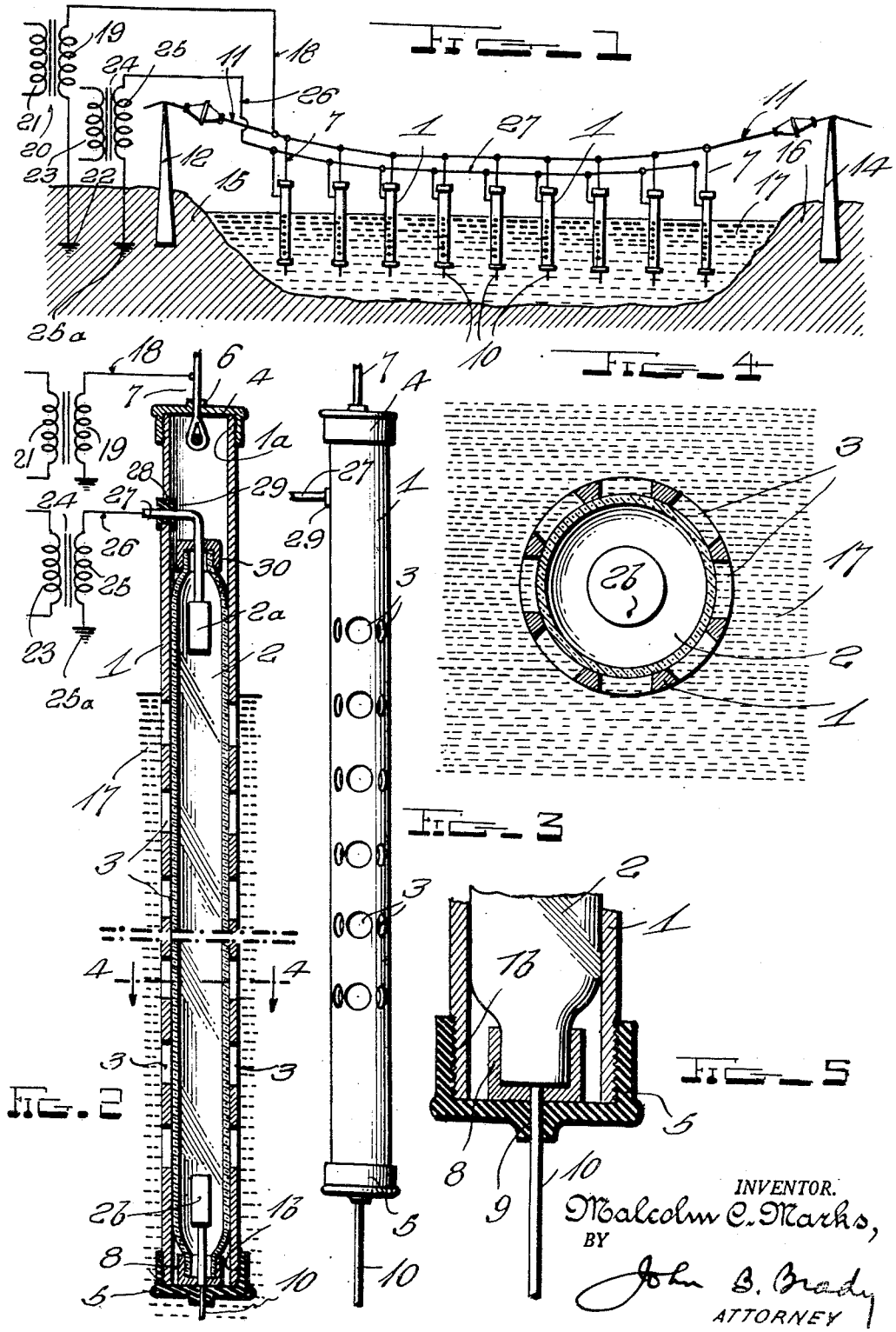
INVENTOR.
Malcolm C. Marks,
BY
John B. Brady
ATTORNEY

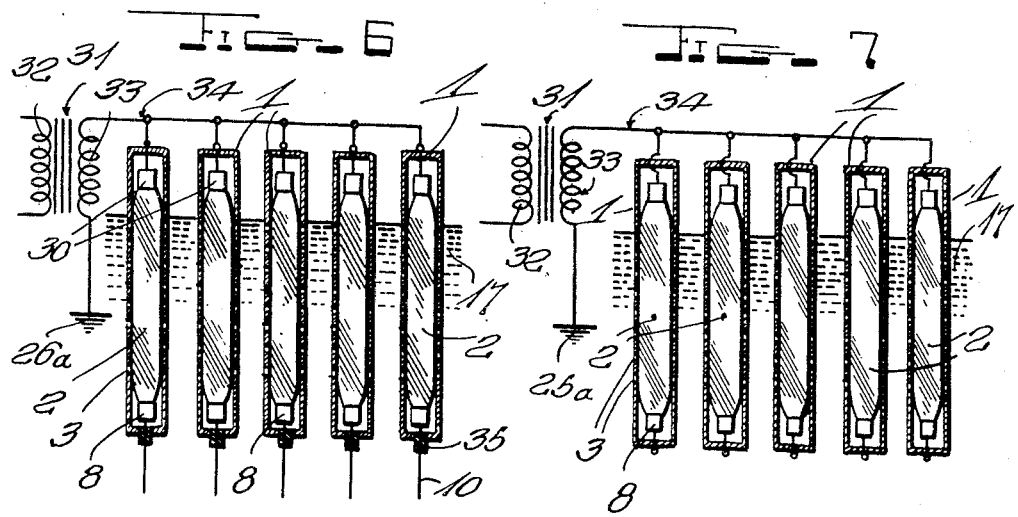
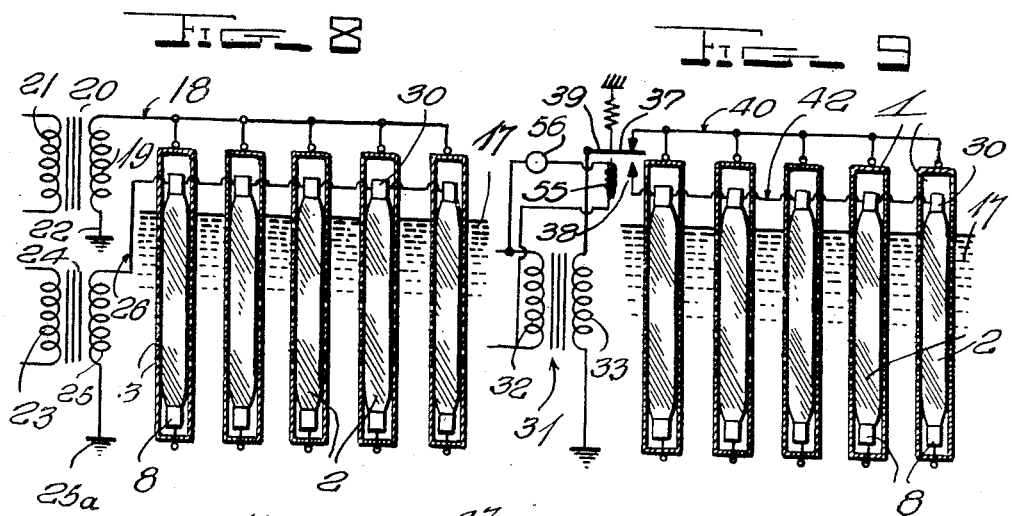
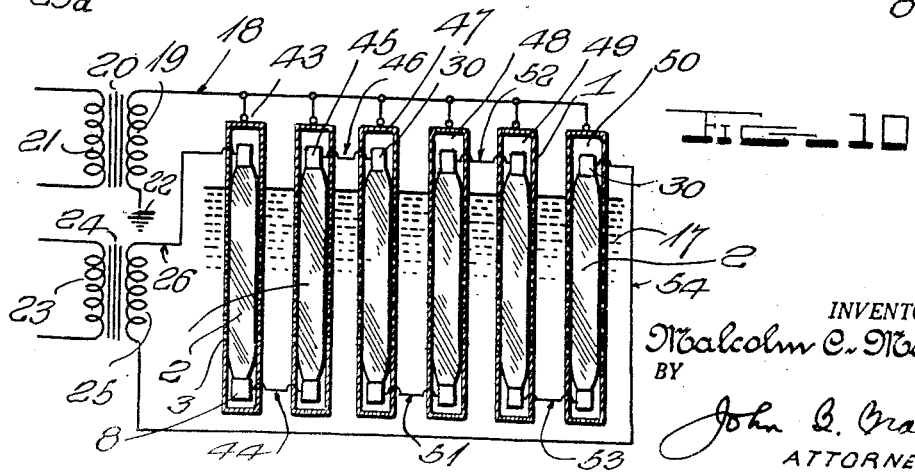

United States Patent Office 2,709,984
Patented June 7, 1955

2,709,984

ELECTRIC FISH SCREEN ELECTRODE INCORPORATING A SELF-CONTAINED LIGHT SOURCE

Malcolm C. Marks, Redwood City, Calif., assignor to American Institute of Radiation, Belmont, Calif., a corporation of California Application September 8, 1950, Serial No. 183,819

6 Claims. (Cl. 119—3)

My invention relates broadly to electric fish screen systems and more particularly to an electrode for electric fish screens incorporating a self-contained light source.

My invention is directed to the art of electric fish screens as set forth more fully in co-pending application Serial No. 149,424, filed March 13, 1950, by Hans Barth.

One of the objects of my invention is to provide an improved construction of electrode for electric fish screens which incorporates both a light source and means for developing electric shocks beneath the surface of the water.

Another object of my invention is to provide a composite electrode which may be suspended at spaced intervals in the water and constituting an electric fish screen for compositely imparting electric shocks and radiating light rays beneath the surface of the water.

A further object of my invention is to provide a construction of composite shock emitting element and light radiating element conjointly constituting an electrode for electric fish screens where a variety of electrical circuits may be employed for electrically connecting the shock and light elements with the power supply circuits.

Still another object of my invention is to provide an arrangement of electrode for electric fish screens employing both shock and light elements in which the circuits through the shock and light elements may be arranged in series or in parallel with a power source or separately excited over different time intervals from a time source for facilitating the installation of the electrode in fish screen systems which may be arranged to satisfy various existing conditions.

Other and further objects of my invention are to provide electric circuit arrangement for composite electrodes forming an electric fish screen as set forth more fully in the specification hereinafter following by reference to the accompanying drawings in which:

Figure 1 illustrates schematically an electric fish screen installation in a stream where separate power sources are employed for the shock and light elements of the electrodes of the screen; Fig. 2 is a vertical sectional view on an enlarged scale taken through one of the electrodes in the fish screen illustrated in Fig. 1; Fig. 3 is a side elevational view of the electrode illustrated in Fig. 2, the view being shown on a somewhat reduced scale as compared with the scale of Fig. 2; Fig. 4 is an enlarged transverse sectional view on line 4—4 of Fig. 2 showing the structure of the electrode by which light rays are emitted under water with minimum obstruction due to the casing of the electrode; Fig. 5 is an enlarged fragmentary sectional view of the end of one of the electrodes illustrating the manner in which the light source is insulatingly mounted interiorly of the electrode with a grounding connection from one side of the light source extending into the water; Fig. 6 is a schematic wiring diagram showing a multiplicity of shock and light elements constructed in accordance with my invention and connected in parallel with a single power source where the light elements are insulated from the electrodes and grounded into the water through extending rod members; Fig. 7 is a view similar to the view shown in Fig. 6 except that the light and shock elements are so arranged that these elements are connected in series forming a single power source where current passing through and igniting the gas discharge also energizes the shock elements of the electrode; Fig. 8 shows a modified circuit arrangement embodying my invention where both shock and light elements are connected in parallel to separate power sources, both elements having a common ground; Fig. 9 is a view similar to the views shown in Figs. 6–8 but showing separate parallel shock and light circuits activated through a selective relay from a common power source; and Fig. 10 is a schematic view showing a further modified circuit arrangement for the electrodes of my invention where the shock elements connect in parallel and the light elements connect in series to separate power sources.

The device of my invention in intended to be incorporated into any type of electric fish screen utilizing any manner of shock, sonic, frequency, and pressure pulses where it is found advantageous to use a fixed or shock synchronized light to attract and indicate to the fish the direction in which such repelling forces originate for guiding the fish in a desired course.

The basic principle in the unit of my invention is to incorporate any type of suitable light directly into the shock producing electrode itself. This may be accomplished in a great many different ways. For purposes of explaining my invention I have shown a suspended, or hanging pipe type of electrode, which is the type of electrode most commonly used in the majority of electric fish screen installations. It should be understood that such a unit's application is not confined to this one type of installation, but can readily be adapted to any specific fish screen setup which utilizes any type of electric electrodes, or other devices, to transmit shock waves or pressure pulses to the water.

Figs. 1–5 of the drawings indicate the circuit arrangement and construction details for the unit of my invention incorporating with a suspended pipe type electrode 1 and illuminating unit 2. Hereinafter in the claims I have termed the suspended pipe type electrode 1 as a tubular conductive member to clearly bring out the fact that an electrical power source terminating on the tubular conductive member may be used as a shock producing device. The illuminating unit 2 is constituted by a light device that is enclosed by the tubular conductive member and which is visible through the said member through perforations in the wall of the tubular conductive member. The pipe 1 itself can be of any desired dimensions, as to length, diameter, and thickness. The material may be any type of metal which proves suitable for the particular installation and meets all other demands of the builder. Instead of using standard pipes, the electrodes can be manufactured from any form of metal. As an example, cold rolled stock or flat sheet metal may first be perforated and then formed into any desired shape or form to meet the requirements of their application.

In the illustrated example, the pipe 1 is perforated by a plurality of rows of apertures 3 distributed around the circumference of the pipe, in order to provide illumination outlets under the water. Within the perforated pipe 1 is mounted a gaseous discharge tube or illuminating unit 2 constituting a tubular light source manufactured to the necessary specifications to permit its properly fitting of the tube 2 into the pipe 1. The gaseous discharge tube 2 may be of the type of neon light or any other type of light may be incorporated into pipe 1, as for example, a fluorescent, incandescent lamps, etc. The color and intensity of light emitted may be easily established when designing the light element itself, thus providing a very wide range of variations adapting the pipe 1 to the requirements and conditions presented by the particular installation.

The pipe 1 is threaded at the top 1a and bottom 1b to accept a pipe cap 4 at the top thereof and a cap of insulation material 5 at the bottom to close both ends of the pipe. The top cap 4 is drilled at 6 to accommodate the suspension cable 7 from which the pipe is hung in a depending vertical position and through which the electric power is supplied to the pipe thus constituting the pipe as an underwater electrode. The bottom cap 5 forms a support for the end cap 8 of the lamp 2 and is centrally apertured as at 9 for the passage of a metal rod 10 into the water in installations where it is desired to isolate the light source and screen power supply.

The particular neon tube shown in Figs. 1–5 of the drawings contains an electrode 2a and 2b in each end of the tube, which ignite the gas within the tube 2 when a sufficient electrical potential is applied to them. However, the drawings merely indicate one way of incorporating a light within the pipe electrode. There are many other variations, governed by particular factors, such as power potential, current frequency, amperage, etc., that permit the use of different types of gas discharge tubes. Examples of such tubes are cold cathode types, heater types, tubes with electrodes, and tubes without electrodes. These factors also govern the possible electrical circuits which are used to correlate the synchronized action between the shock pulses and light flashes. Benefits resulting from some of these variations will be explained in the specification hereinafter following setting forth the advantages of a light electrode of this kind.

The history of electric fish screens indicates the effectiveness of such devices in the control of the movements of both resident and migrating fish in coastal waters, streams, rivers, and lakes. However, the records indicate, in most cases, that the percentage of efficiency of the screens is well below 100%.

There are many contributing factors to this inefficiency. One outstanding factor is the confusion of the fish when entering the electrical field of the screen. This confusion results because of their inability to ascertain from which direction the shock pulses are coming, due to the fact that it feels them all over its body. As a result, rather than turning away from the screen, in his confusion, the fish may enter further into the electrical field, thus becoming paralyzed and being then unable to turn away even though he may have wished to do so. As a result, the fish are carried through the screen by the current of the water, or continue on through the screen under their own momentum because the fish do not then have the ability to control their movements. The fish must be given a sense of direction from which the shock pulses originate. Tests have been made which indicate favorably that fish respond to light as a means of sensing the source of these electrical shocks. Light electrodes installed in the fish screens will give the fish this sense of direction. As a result, the efficiency of the screen is increased considerably.

Another advantage of the type of an electrode according to my invention is that it combines both the shock producing and light producing element into one electrode. This puts the light directly in the screen itself where it is most efficient, thereby eliminating the necessity of separate light units, and thus simplifying the whole installation, and reducing its cost. It also provides a metal shielding for giving suitable protection to the light element itself.

Still other advantages can be realized from different types of electrical circuits combined with different types of light elements. Variations in this respect prove very valuable to the screen builder in designing an installation to meet the requirements of any specific project, and at the same time simplifying construction, reducing installation costs, and reducing operating costs. As an example, instead of operating the light source through a separate circuit from a separate transformer, by using a properly designed light element, it is possible to connect both the shock and light elements in series, and operate both from a single pulsing unit. If gas discharge tubes not having any electrodes and which only require that they be within the vicinity of an electrical field of sufficient potential and frequency to ignite them, are used, it is only necessary to enclose such light elements within the electrode without any additional wiring, and merely apply the necessary electrical currents to the electrode itself. Both examples, just cited, reduce the operating cost considerably, since the power required to energize the screen also operates the light units.

Considering the various ways in which such units may be incorporated together, it becomes quite apparent that this type of screen electrode fits very well into any manner of fish screen installation where it is found advantageous to indicate to the fish the direction of the shock pulses.

In Fig. 1 I have shown a multiplicity of composite electrodes constructed in accordance with my invention suspended at spaced intervals from a cable 11 which is supported at opposite ends on suitable standards 12 and 14 erected on opposite banks 15 and 16 of the stream 17 which is to be protected. The power for the shock element of the electrode constituted by the metallic pipe 1 is supplied through electrical connection 18 electrically connected with secondary winding 19 of power transformer 20 whose primary winding 21 connects with an alternating power source. The opposite end of secondary winding 19 is grounded as represented at 22 thus completing an electrical path from the opposite side of secondary winding 19 through conductor 18 and depending suspension cable 7 to the metallic pipe 1 through the water 17 to ground 22 returning to the other side of secondary winding 19.

The circuit through the light element 2 is established from a power source which connects with primary winding 23 of power transformer 24 having a secondary winding 25 one end of which connects through cable 26 with a conductor 27 which is supported by suspension cable 11. The conductor 27 has a multiplicity of taps leading to the spaced electrodes. As shown more particularly in Fig. 2 the pipe 1 is apertured in one side thereof at 28 adjacent the top of the electrode. A tubular insulator 29 extends through aperture 28 and provides an insulated path for the passage of the tap extending from conductor 27 and electrically connected with the end cap 30 on the discharge tube 2. I have schematically shown the connection 27 leading through end cap 30 and establishing connection with electrode 2a in the upper end of gaseous discharge tube 2. It will be understood that this connection may be established through a solder lug on the end cap 30 or through a clip connection. The purpose of the illustration is to schematically show the path of the electric current through the discharge tube 2 which fits snugly within the inside of pipe 1 with the luminous envelope thereof clearly visible from the interior of the electrode 1 through the apertures 3 distributed around the circumference of pipe 1. The secondary winding 25 is grounded at its opposite end as represented at 25a for completing the current path is the luminous exciting current through the ground, the water 17, the depending electrode 10 connecting to the lower end cap 8 of luminous discharge tube 2 and being completed from electrode 2a in the upper end of tube 2 through end cap 30 and tap 27 to conductor 26 leading to the opposite end of transformer secondary 25.

The tubular insulator 29 is located sufficiently below the top end of pipe 1 to permit convenient connection to be made to the upper end of the gaseous discharge tube 2. The connection from the lower end of the gaseous discharge tube has already been described as including metal rod 10 which is insulated from the pipe 1 and extends into the water 17 constituting with the electrically conductive tubular member 1 a shock propagating member. The perforations 3 in the pipe 1 are so distributed as to offer minimum obstruction to the radiation of light in a substantially uniform field around the electrode for providing a brilliant light source for indicating to the fish the direction of the shock pulses. As heretofore noted, the arrangement illustrated in Figs. 1–5 contemplates two separate power sources for activating independently the shock element and the light element of the electrode. I may connect the separate shock and light elements in a variety of ways as represented in Figs. 6–10. In Fig. 6 I have shown a single power source constituted by transformer 31 having a primary winding 32 connected to a source of alternating current and a secondary winding 33 connected at one end through conductor 34 to each of the electrode housings 1 of a plurality of composite shock and light electrodes disposed in spaced relation and submerged in water 17 in positions in which the upper end caps 30 are all maintained safely above the water level. The lower end caps 8 of the luminous discharge tubes 2 connect with metal rods 10 which depend downwardly with respect to each of the electrodes which are electrically insulated from the conductive housings 1 as schematically indicated at 35. The opposite end of secondary winding 33 connects to ground 26A completing the electrical path through water 17 to the opposite side of the shock elements constituted by the pipe 1. It will be understood that the structure schematically shown in Fig. 6 may be similar to that shown in Figs. 2, 3 and 5. The shock and light elements thus connect in parallel with a single power source rather than the two power sources indicated in Figs. 1 and 2. Also in Figs. 1, 2, 3, 5 and 6, due to circuit requirements, pipe cap 5 is of an insulative material. In Figs. 7, 8 and 9, a description of which follows, pipe cap 5 should be of a conductive material, since in these circuits end cap 8 of the light elements must be connected electrically to the conductive housing of shock electrodes 1.

The light and shock elements may be connected in series from a single power source as represented in Fig. 7. In this arrangement the conductor 34 which extends from the end of secondary winding 33 of the transformer 31 that is activated from primary winding 32, delivers illuminating current to the upper ends of luminous discharge tubes 2 in such manner that electrical connection is not made to the conductive housings 1 of the devices. That is the connection between cable 34 is insulated from the conductive housings 1 which connects with the upper electrode of each of the luminous discharge tubes 2. The electrode of each of the luminous discharge tubes 2 connects through end cap 8 with the material of the conductive housings 1 submerged in water 17. Current passing through and activating the gaseous discharge tubes 2 reaches the conductive housings 1 after the luminous discharge tubes 2 are activated. Thus a series path is established whereby luminous activation is provided followed thereafter by activation of the shock element through conductive housings 1 from the lower ends of the gaseous discharge tubes 2 through the water 17 to ground 25a from which the path for developing the shock pulses is secured.

As shown in Fig. 8 I may provide a circuit connection where both the shock and light elements connect in parallel to separate power sources similar to the disclosure in Figs. 1–5 and both have a common ground. In this arrangement the separate power sources are constituted as heretofore explained in connection with Figs. 1 and 2 by transformer systems 20 and 24, where the shock elements constituted by conductive housings 1 connect through conductor 18 with secondary winding 19 and where the light elements 2 have their upper end caps 30 connected with conductor 26 leading from secondary winding 25 but well insulated from the conductive housings 1. The lower end caps 8 of the gaseous discharge tube 2 are each electrically connected with the electrically conductive housings 1. Thus the light elements 2 and the shock elements 1 both have a common ground through water 17 leading to the grounds 22 and 25a to secondary windings 19 and 25 respectively. This arrangement effectively places the shock elements and light elements in parallel through a common ground connection.

In Fig. 9 I have shown an arrangement of switch contacts 37 and 38 connected through switch armature 39 which may be switched from one contact to the other to apply to the contacts power from the secondary winding 33 of the transformer circuit 31 having its primary winding 32 excited from an alternating power source. Conductor 40 extends from contact 37 to each of the conductive housings 1 while conductor 42 leads from contact 38 to the upper end caps 30 of each of the gaseous discharge tubes 2 but in a manner in which conductor 42 is thoroughly insulated from the conductive housings 1 similar to the arrangement illustrated in Fig. 8. The lower end caps 8 of the gaseous type tubes 2 connect with the housings 1 at the lower ends thereof providing a common ground for the shock and the light elements. The relay armature 39 is operated by a pulsing magnet 55 which operates at millisecond time intervals from the power circuit leading to primary winding 32 through any suitable control means such as thermal circuit interrupter 56 of the type shown for example in Patent 1,898,174, of February 21, 1933, to William Dubilier, for Flasher Device, for synchronized action for alternately applying a shock pulse and a light pulse under the surface of the water.

In Fig. 10 I have shown a circuit arrangement where the shock elements are arranged in parallel while the light elements are arranged in series and connected to separate power sources. Submerged connections must be used in this arrangement and the submerged connections must be sealed against the entry of water and insulated from the electrodes. The two separate sources are arranged similar to the arrangements in Figs. 1, 2 and 8 where the conductor 18 connects as heretofore to the upper ends of the conductive housings 1. The conductor 26 leading from the secondary winding 25 of the power source 24 connects to the upper end cap 30 of the electrode to the extreme left indicated at 43, the connection being insulated from the conductive housing 1. The lower end cap 8 of the gaseous discharge tube 2 connects through jumper 44 electrically insulated from the conductive housing 1 of electrode 43 and extends to the lower end cap 8 of gaseous discharge tube 2 in the adjacent electrode 45. The upper end cap 30 of the gaseous discharge tube 2 within electrode 45 connects through bus 46 with the upper end cap 30 of the gaseous discharge tube in electrode 47. The balance of the circuit follows this same pattern, these electrodes 48, 49 and 50 each containing gaseous discharge tubes are arranged with bus connections at opposite ends of the housings represented at 51, 52 and 53 so that all of the gaseous discharge tubes 2 are in series. The terminating end of the series path for the gaseous discharge tubes connects to end cap 30 of the gaseous discharge tube in electrode 50 through conductor 54 leading to the opposite end of secondary winding 25. In each instance the buses at 51, 52 and 53, etc. are well insulated from the conductive housings 1. Thus a series electrical path is established through the light elements while the shock elements are disposed in parallel with the activating current supplied thereto from secondary winding 19 of transformer 20 as explained in connection with Figs. 1, 2 and 8.

Other circuit arrangements for the electrodes in the system of my invention may be provided and I desire

What I claim as new and desire to secure by Letters Patent of the United States is:

1. A composite underwater light emitting and shock pulse propagating electrode comprising a tubular conductive member apertured for the passage of light rays throughout substantially the entire length thereof, a flexible pendent suspension means connected with the upper end of said tubular conductive member for supporting said member in a vertically pendent position partially submerged in water, an electric circuit connected with said member through said flexible pendent suspension for conducting shock voltages to said member and into the water surrounding said member, an elongated light device enclosed by and substantially conforming with the contour of said tubular conductive member for directing light rays through the apertures therein substantially throughout the entire length of said member and through the surrounding water and an electrical power supply circuit connected with said light device for energizing said light device concurrently with the propagation of shock pulses through the water from the tubular conductive member surrounding said light device.

2. A composite underwater light emitting and shock pulse propagating electrode, as set forth in claim 1, in which said elongated light device is a tubular gaseous discharge tube which substantially fills the interior of said tubular conductive member along the length thereof.

3. A composite underwater light emitting and shock pulse propagating electrode, as set forth in claim 1, in which said elongated light device is electrically connected at one terminal with said tubular conductive member and where the other terminal of said elongated light device is electrically insulated from said tubular conductive member.

4. A composite underwater light emitting and shock pulse propagating electrode, as set forth in claim 1, in which said elongated light device is supported in said tubular conductive member by means of a cap of insulation material engaging the lower end of said tubular conductive member.

5. A composite underwater light emitting and shock pulse propagating electrode, as set forth in claim 1, in which said elongated light device is of tubular construction extending linearly of said tubular conductive member with a terminal connection on both the upper and lower ends thereof, a conductor connected with the terminal connection on the lower end of said light device and depending downwardly therefrom and a cap of insulation material centrally apertured for the passage of said conductor and operating to support said elongated light device within said tubular conductive member.

6. An electric fish screen comprising a multiplicity of spaced flexibly suspended electrodes partially submerged in water, each of said electrodes comprising a lineally extending composite shock propagating member and an elongated light source having terminals on opposite ends thereof, connections between one terminal of each light source with each individual shock propagating member with which it is associated, separate connections from the other terminals of said light sources to a contact element, a second contact element connected with each of said shock propagating members in parallel, a power source, a contactor connected with said power source and movable intermittently in contact with each of said contact elements, and means for controlling the movement of said contactor for alternately connecting said power source to said contact elements and alternately propagating shock pulses and light rays through the water in which said electrodes are partially submerged.

References Cited in the file of this patent

UNITED STATES PATENTS

| | | |
|---|---|---|
| 1,515,547 | Burkey | Nov. 11, 1924 |
| 1,663,465 | Neff | Mar. 20, 1928 |
| 1,696,026 | Bode | June 21, 1928 |
| 1,962,420 | Bradley | June 12, 1934 |
| 1,985,921 | Folmer | Jan. 1, 1935 |
| 2,061,458 | Folmer et al. | Nov. 17, 1936 |
| 2,092,136 | Plym et al. | Sept. 7, 1937 |
| 2,106,528 | Jones et al. | Jan. 25, 1938 |
| 2,121,114 | Beck | June 21, 1938 |
| 2,237,534 | Van Der Clute | Apr. 8, 1941 |